United States Patent
Kuboki et al.

(10) Patent No.: US 10,447,022 B2
(45) Date of Patent: Oct. 15, 2019

(54) CONDUCTIVE MEMBER

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hideyuki Kuboki, Yokkaichi (JP); Hiroki Hirai, Yokkaichi (JP); Makoto Higashikozono, Yokkaichi (JP); Akihisa Hosoe, Osaka (JP); Yoshiyuki Hirose, Osaka (JP); Tomoharu Takeyama, Osaka (JP); Eiichi Kobayashi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/781,831

(22) PCT Filed: Jan. 31, 2017

(86) PCT No.: PCT/JP2017/003332
§ 371 (c)(1),
(2) Date: Jun. 6, 2018

(87) PCT Pub. No.: WO2017/141690
PCT Pub. Date: Aug. 24, 2017

(65) Prior Publication Data
US 2018/0366931 A1 Dec. 20, 2018

(30) Foreign Application Priority Data
Feb. 19, 2016 (JP) .................. 2016-030290

(51) Int. Cl.
*H02G 5/06* (2006.01)
*H02G 5/10* (2006.01)
(Continued)

(52) U.S. Cl.
CPC .............. *H02G 5/10* (2013.01); *H02G 5/06* (2013.01); *B60L 53/302* (2019.02); *B60R 16/02* (2013.01); *H01B 7/423* (2013.01)

(58) Field of Classification Search
CPC ........... H02G 5/10; H02G 5/06; H02G 5/061; H02G 5/063; H01B 7/423; H01B 7/42;
(Continued)

(56) References Cited

U.S. PATENT DOCUMENTS 5,900,585 A * 5/1999 Winfield ............. H02G 15/184
174/74 R
5,952,612 A * 9/1999 Winfield ............. H02G 15/103
174/74 R
(Continued)

FOREIGN PATENT DOCUMENTS

JP S51-052979 U 4/1976
JP S55-021546 U 2/1980
(Continued)

OTHER PUBLICATIONS

Apr. 4, 2017 International Search Report issued in International Patent Application No. PCT/JP2017/003332.
(Continued)

*Primary Examiner* — Angel R Estrada
(74) *Attorney, Agent, or Firm* — Oliff PLC

(57) ABSTRACT

A conductive member includes an enclosure, a coolant, and a conductor. The enclosure includes a sheet and has liquid
(Continued)

tightness. The coolant is enclosed in the enclosure. The conductor includes a cool section that is disposed in the enclosure and a projecting section that is liquid-tightly sealed with the sheet and projects from the enclosure.

6 Claims, 5 Drawing Sheets

(51) Int. Cl.
*H01B 7/42* (2006.01)
*B60R 16/02* (2006.01)
*B60L 53/302* (2019.01)

(58) Field of Classification Search
CPC .......... H01B 7/421; H01B 7/29; H01B 7/292; B60R 16/02; B60R 16/00; B60R 16/005; B60L 53/302

USPC ... 174/17.05, 17 R, 17.06, 17.08, 17 LF, 50, 174/520, 50.5, 50.52, 252, 138 R, 137 R; 361/600, 601, 676, 677
See application file for complete search history.

(56) References Cited

U.S. PATENT DOCUMENTS

| | | | | |
|---|---|---|---|---|
| 5,978,220 A | * | 11/1999 | Frey | H01L 23/473 361/677 |
| 7,863,521 B2 | * | 1/2011 | Campbell | H02G 15/1826 174/93 |
| 8,003,891 B2 | * | 8/2011 | Rocks | H01B 17/28 174/142 |
| 8,134,089 B2 | * | 3/2012 | Roseen | H01B 17/303 174/650 |
| 8,575,491 B2 | * | 11/2013 | Gundel | H01B 7/0861 174/117 F |
| 8,742,255 B2 | * | 6/2014 | Pavlovic | H05K 9/005 174/50 |

FOREIGN PATENT DOCUMENTS

| | | |
|---|---|---|
| JP | S60-123913 U | 8/1985 |
| JP | S61-147410 A | 7/1986 |
| JP | H07-66575 A | 3/1995 |
| JP | H08-083632 A | 3/1996 |
| JP | 2004-132556 A | 4/2004 |

OTHER PUBLICATIONS

Apr. 4, 2017 Written Opinion issued in International Patent Application No. PCT/JP2017/003332.

* cited by examiner

CONDUCTIVE MEMBER

TECHNICAL FIELD

The present invention relates to a conductive member.

BACKGROUND ART

Conductive members disclosed in Japanese patent application publication No. H8-83632A have been known as conductive members that carry electric currents. In this document, the conductive members including a busbar and electric wires are described.

CITATION LIST

Patent Document

Patent Document 1: Japanese Patent Application Publication No. H8-83632A

SUMMARY OF INVENTION

Technical Problem

Recently, it is expected that conductive members connected to batteries in electric vehicles and hybrid vehicles can carry relatively large electric currents. Due to heat generated during conduction of electric current in the conductive members, temperatures of the conductive members increase. Components that are relatively sensitive to heat among other components connected to the conductive members may fail due to the heat.

According to Joule's low, an amount of heat Q through conduction of electric current in a conductive member for t seconds is proportional to the product of a resistance R of the conductive member and the square of the electric current I ($Q=RI^2t$). Because the amount of heat increases in response to the square of the electric current, the amount of heat could be an issue especially when a relatively large current is passed through the conductive member.

To reduce the amount of heat, the resistance of the conductive member may be reduced. To reduce the resistance of the conductive member, the cross section of the conductive member may be increased, which may result in an increase in size of the conductive member and thus may not be a practical solution. Therefore, it is expected that the conductive member is efficiently cooled during conduction of electric current.

The technology described herein was developed in view of the above circumstances. An object is to provide a technology for improving efficiency in cooling of a conductive member.

SUMMARY

The technology described herein is a conductive member includes an enclosure, a liquid coolant, and a conductor. The enclosure includes at least one sheet and has liquid tightness. The liquid coolant is enclosed in the enclosure. The conductor includes a cool section that is disposed in the enclosure and a projecting section that projects from the enclosure. The projecting section is liquid-tightly bonded with the at least one sheet.

When the conductor is conducted, heat is generated. The heat is transmitted to the liquid coolant disposed around the conductor. As a result, the conductor is cooled. Therefore, efficiency in cooling of the conductive member can be improved.

A temperature of the liquid coolant increases due to the heat from the conductor and the liquid coolant is vaporized. The conductor of the conductive member is further cooled by heat of vaporization of the liquid coolant. Therefore, the efficiency in cooling of the conductive member can be further improved.

According to the technology described herein, the efficiency in cooling of the conductive member can be improved.

DESCRIPTION OF EMBODIMENTS

First Embodiment

Figure 1:
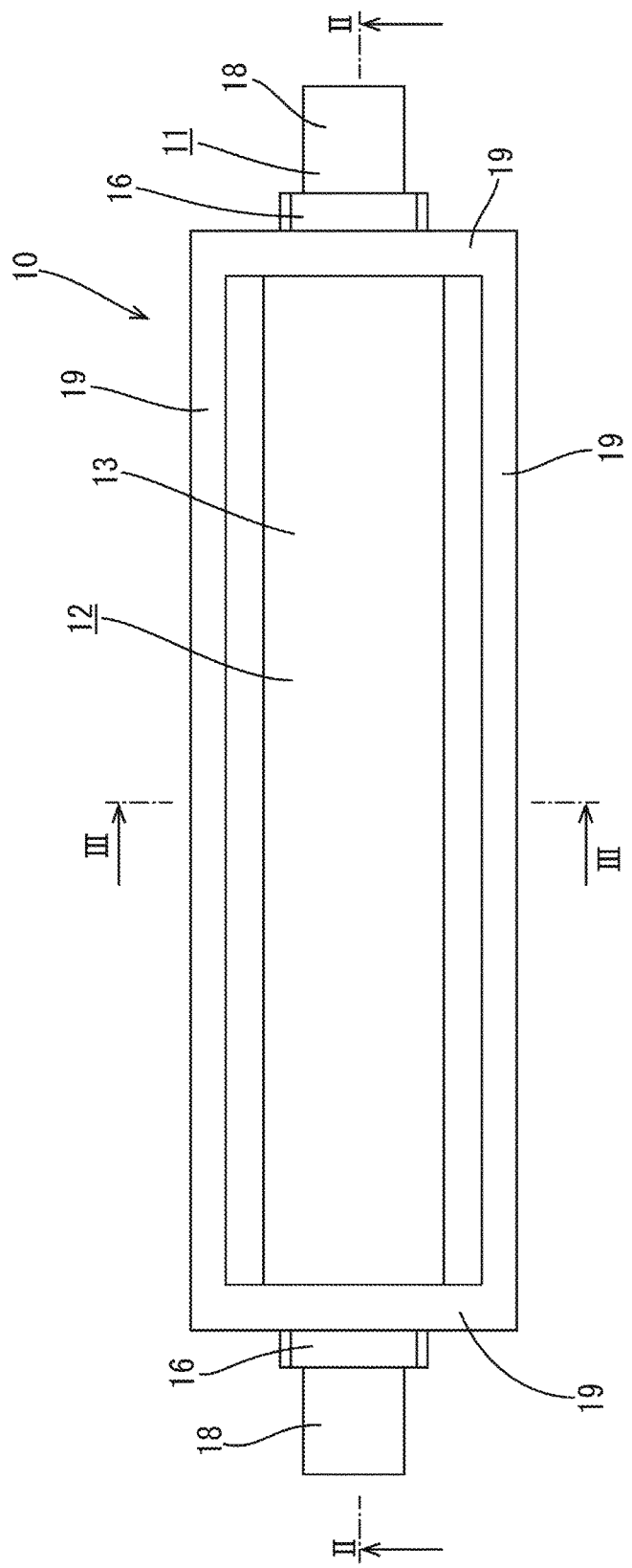
FIG. 1 is a plan view illustrating a conductive member according to a first embodiment.
Figure 2:
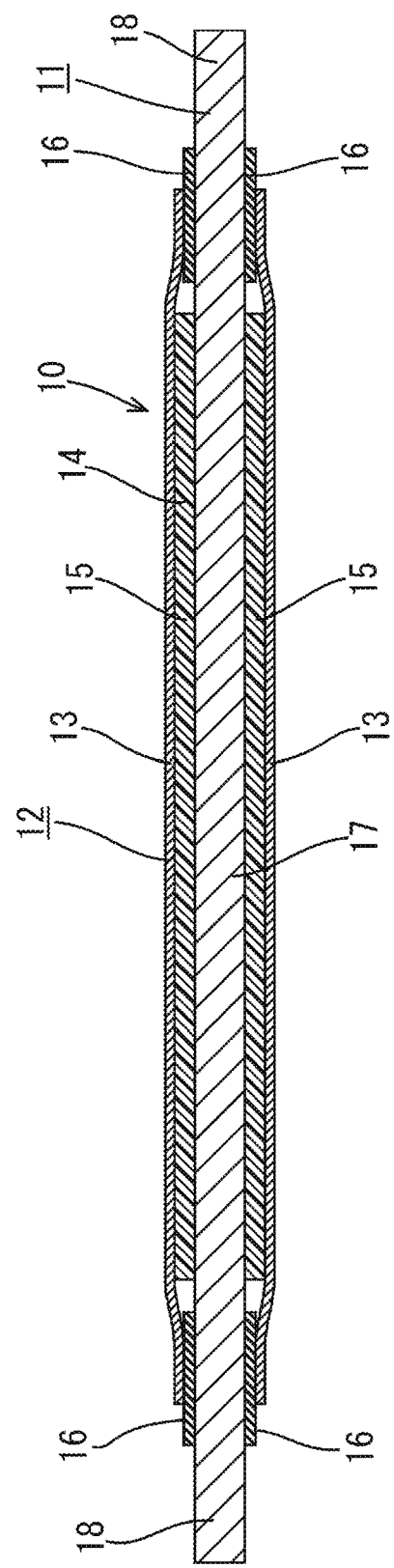
FIG. 2 is a cross-sectional view along line II-II in FIG. 1.
Figure 3:
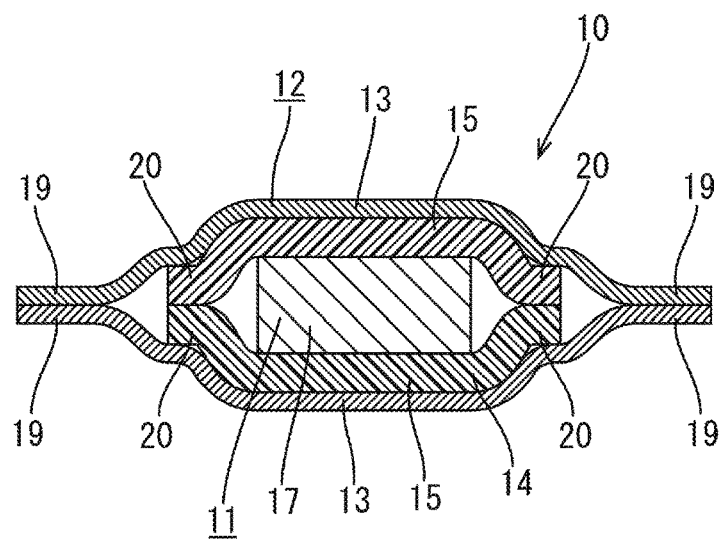
FIG. 3 is a cross-sectional view along line III-III in FIG. 1.

A first embodiment of the technology disclosed herein will be described with reference to FIGS. 1 to 3. A conductive member 10 according to this embodiment may be installed in a vehicle (not illustrated) such as an electric vehicle and a hybrid vehicle and connected to a device through which a relatively larger electric current is passed such as a battery; an inverter, and a motor. The conductive member 10 includes a bus bar 11 (an example of a conductor) and an enclosure 12 disposed to enclose the busbar 11.

Busbar 11

The busbar 11 is prepared by forming a metal plate into a predefined shape. A material of the busbar 11 may be selected from any metals such as copper, copper alloy, aluminum, and aluminum alloy as appropriate.

The busbar 11 in this embodiment is formed in a rectangular bar shape with a rectangular cross section. The shape of the busbar 11 is not limited to the rectangular bar shape. For example, the busbar 11 may be in a plate shape. The busbar 11 may have a polygonal cross section such as a triangular cross section and a pentagonal cross section, a circular cross section, an elliptic cross section, or an oval cross section. The busbar 11 may have any shape as appropriate.

Enclosure 12

The enclosure 12 includes a pair of sheets that are plated on top of each other. Corresponding edges of the sheets are liquid-tightly bonded together. Edges of the enclosure 12 are liquid-tightly bonded and referred to as bonded sections 19.

Sheets 13 included in the enclosure 12 may be made of synthetic resin having insulating properties. The sheets 13 may include metal sheets and synthetic resin films having insulating properties. Each synthetic resin film may cover a surface of the metal sheet. The sheets 13 are placed on top of each other such that the synthetic resin films are opposed to each other. Each sheet 13 may be a metal sheet with both surfaces covered with synthetic resin films.

The synthetic resin of the synthetic resin film may be any kind of synthetic resin selected as appropriate, for example, polyolefin such as polyethylene and polypropylene, polyester such as polybutylene terephthalate and polyethylene terephthalate, and polyamide such as nylon 6 and nylon 6,6.

The metal of the metal sheet may be any kind of metal selected as appropriate, for example, aluminum, aluminum alloy, copper, and copper alloy. With the metal sheets included in the sheets 13, heat dissipation efficiency of the conductive member 10 can be improved because the metal sheets have relatively high heat conductivity.

The sheets 13 may liquid-tightly bonded together through thermal fusion bonding of the synthetic resins that are placed on top of each other. The sheets 13 that are placed on top of each other may be liquid-tightly bonded together with an adhesive layer of an adhesive.

Liquid Coolant 14

Liquid coolants 14 having insulating properties are disposed in an internal space of the enclosure 12. As described above, the sheets 13 included in the enclosure 12 are liquid-tightly bonded. Therefore, the liquid coolants 14 are less likely to leak from the enclosure 12. The liquid coolants 14 are held in absorbent sheets 15, which will be described later, and disposed in the internal space of the enclosure 12. In the drawings, reference sign 15 for the absorbent sheets 15 also indicates the liquid coolants 14.

For the liquid coolants 14, any one of or a combination of perfluorocarbon, hydrofluoroether, hydrofluoroketone, fluorine inert liquid, silicone oil, mineral or other type of oil, and hydrocarbon refrigerants may be used.

Absorbent Sheet 15

The absorbent sheets 15 made of material that can hold the liquid coolants 14 therein are disposed in the internal space of the enclosure 12. The absorbent sheets 15 may be woven or nonwoven fabrics prepared through processing of fibers made of material that can hold the liquid coolants. The unwoven fabrics may be fiber sheets, webs (thin film shaped sheets produced from fibers), or batts (felt-like fabrics). The material of the absorbent sheets 15 may be natural fibers, synthetic fibers made of synthetic resin, or a combination of natural fibers and synthetic fibers.

In this embodiment, the absorbent sheets 15 are disposed in the internal space of the enclosure 12 to surround the busbar 11. Specifically, two absorbent sheets 15 are placed on top of each other in a thickness direction thereof. Edges of the absorbent sheets 15 that are placed on top of each other are bonded. The edges of the absorbent sheets 15 bonded together are referred to as absorbent sheet bonded section 20.

The absorbent sheets 15 may be bonded together through thermal fusion bonding of the synthetic resins of the absorbent sheets 15. Alternatively, the absorbent sheets 15 may be bonded together with an adhesive layer (not illustrated).

The busbar 11 and the absorbent sheets 15 may closely contact with each other or have gaps between the busbar 11 and the absorbent sheets 15.

The absorbent sheets 15 hold the liquid coolants 14 therein. An amount of the liquid coolants 14 in the internal space of the enclosure 12 may be about equal to an amount of the liquid coolants held by the absorbent sheets 15 or the amount plus an extra amount, of which the liquid coolants 14 is outside the absorbent sheets 15 in the internal space of the enclosure 12 because the amount of the liquid coolants 14 has exceeded the capacity of the absorbent sheets 15. The amount can be adjusted as appropriate.

Sealant 16

The busbar 11 includes a cool section 17 and projecting sections 18. The cool section 17 is disposed in the internal space of the enclosure 12 and cooled by the liquid coolants 14. The projecting sections 18 project to the outside of the enclosure 12.

As described above, the cool section 17 is surrounded by the absorbent sheets 15. Namely, the liquid coolants 14 held in the absorbent sheets 15 are present around the cool section 17. Therefore, the cool section 17 is cooled by the liquid coolants 14.

The projecting sections 18 of the busbar 11 and the inner surfaces of the sheets 13 are liquid-tightly sealed. Specifically, sealants 16 adhere to the projecting sections 18 and the cool section 17 of the busbar 11 to cross boundaries between the cool section 17 and the projecting sections 18. The sealants 16 are liquid-tightly bonded to the busbar 11 and to the inner surfaces of the sheet 13. The busbar 11 and the sheet 13 are liquid-tightly bonded together with the sealants 16.

Thermal fusion bonding may be used for adhesion of the sealants 16 to the busbar 11 and the sheets 13. The sealants 16, the busbar 11, and the sheets 13 may be bonded together with adhesive layers (not illustrated). Any method may be selected as appropriate.

Functions and Effects of this Embodiment

Next, functions and effects of this embodiment will be described. The conductive member 10 according to this embodiment includes the enclosure 12, the liquid coolants 14, and the busbar 11. The enclosure 12 includes the sheets 13. The liquid coolants 14 are enclosed in the enclosure 12. The busbar 11 includes the cool section 17 that is disposed in the enclosure 12 and the projecting sections 18 that project to the outside of the enclosure 12. The projecting sections 18 and the sheets 13 are liquid-tightly sealed.

When the busbar 11 is conducting, heat is generated. The heat is transmitted to the liquid coolants 14 that are held in the absorbent sheets 15 that are disposed around the busbar 11. As a result, the busbar 11 cools down. According to the configuration, the efficiency in cooling of the conductive member 10 can be improved.

Temperatures of the liquid coolants 14 increase due to the heat from the busbar 11 and the liquid coolants 14 vaporize. Because of heat of vaporization from the liquid coolants 14, the busbar 11 further cools down. The cooling effects of the heat of vaporization are especially effective when the busbar 11 has a local temperature increase. If the busbar 11 has such a local temperature increase, the liquid coolants 14 may have a local temperature increase and thus vaporization of the liquid coolants 14 may accelerate in an area in which the local temperature increase occurs.

When the vaporization of the liquid coolant 14 occurs, an internal pressure of the enclosure 12 increases. The sheets 13 deform and thus an internal volume of the enclosure 12 increases. As a result, the internal pressure of the enclosure 12 decreases. In this embodiment, with the sheets 13 included in the enclosure 12, an increase in the internal pressure due to the vaporization of the liquid coolant 14 can be controlled.

In this embodiment, the sealants 16 are disposed between the projecting sections 18 of the busbar 11 and the inner surfaces of the sheets 13. Gaps between the projecting sections 18 of the busbar 11 and the sealants 16 are liquid-tightly sealed. Gaps between the inner surfaces of the sheets 13 and the sealants 16 are liquid-tightly sealed.

According to the configuration, in the busbar 11, gaps between the projecting sections 18 that are projected from the enclosure 12 and the sheets 13 included in the enclosure 12 are properly sealed.

The absorbent sheets 15 that hold the liquid coolants 14 therein are disposed in the enclosure 12.

According to the configuration, the liquid coolants 14 held in the absorbent sheets 15 are present in the areas in which the absorbent sheets 15 are disposed. The liquid coolants 14 are less likely to be unevenly present in the internal space of the enclosure 12. Therefore, efficiency in cooling is constant in the internal space of the enclosure 12.

In this embodiment, the absorbent sheets 15 surround the periphery of the busbar 11 in the internal space of the enclosure 12.

According to the configuration, further the efficiency in cooling of the busbar 11 is further constant.

The enclosure 12 includes bonded sections 19 that are edges of the sheets 13 disposed on top of each other and liquid-tightly bonded together.

According to the configuration, the enclosure 12 can be easily prepared with a simple method, that is, by bonding the edges that are disposed on top of each other.

Modification of the First Embodiment

Figure 4:
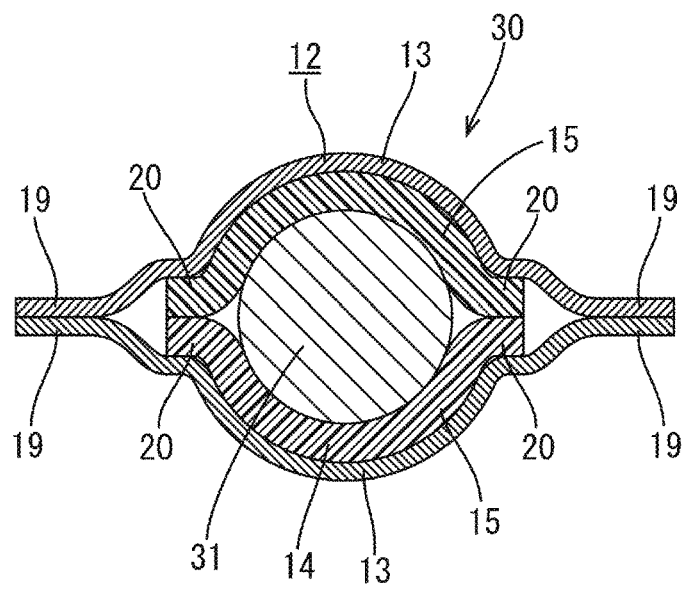
FIG. 4 is a cross-sectional view illustrating a conductive member according to a modification of the first embodiment.

In FIG. 4, a conductive member 30 according to a modification of the first embodiment is illustrated. In this modification, an electric wire 31 is used as an example of a conductor.

The electric wire 31 has a circular cross section. The electric wire 31 may include metal thin wires that are twisted together. Alternatively, the electric wire 31 may be a single core that is a metal bar having a circular cross section.

The electric wire 31 in this embodiment is a bare electric wire, that is, an electric wire without an insulating sheath that is made of synthetic resin having insulating properties. However, a covered electric wire that is an electric wire covered with an insulating sheath can be used.

Second Embodiment

Next, a second embodiment of a technology disclosed herein will be described with reference to FIGS. 5 and 6.

A conductive member 40 according to this embodiment includes an enclosure 41 that includes a sheet 42. The sheet 42 is folded and edges of the sheet 42 are liquid-tightly bonded together.

Figure 5:
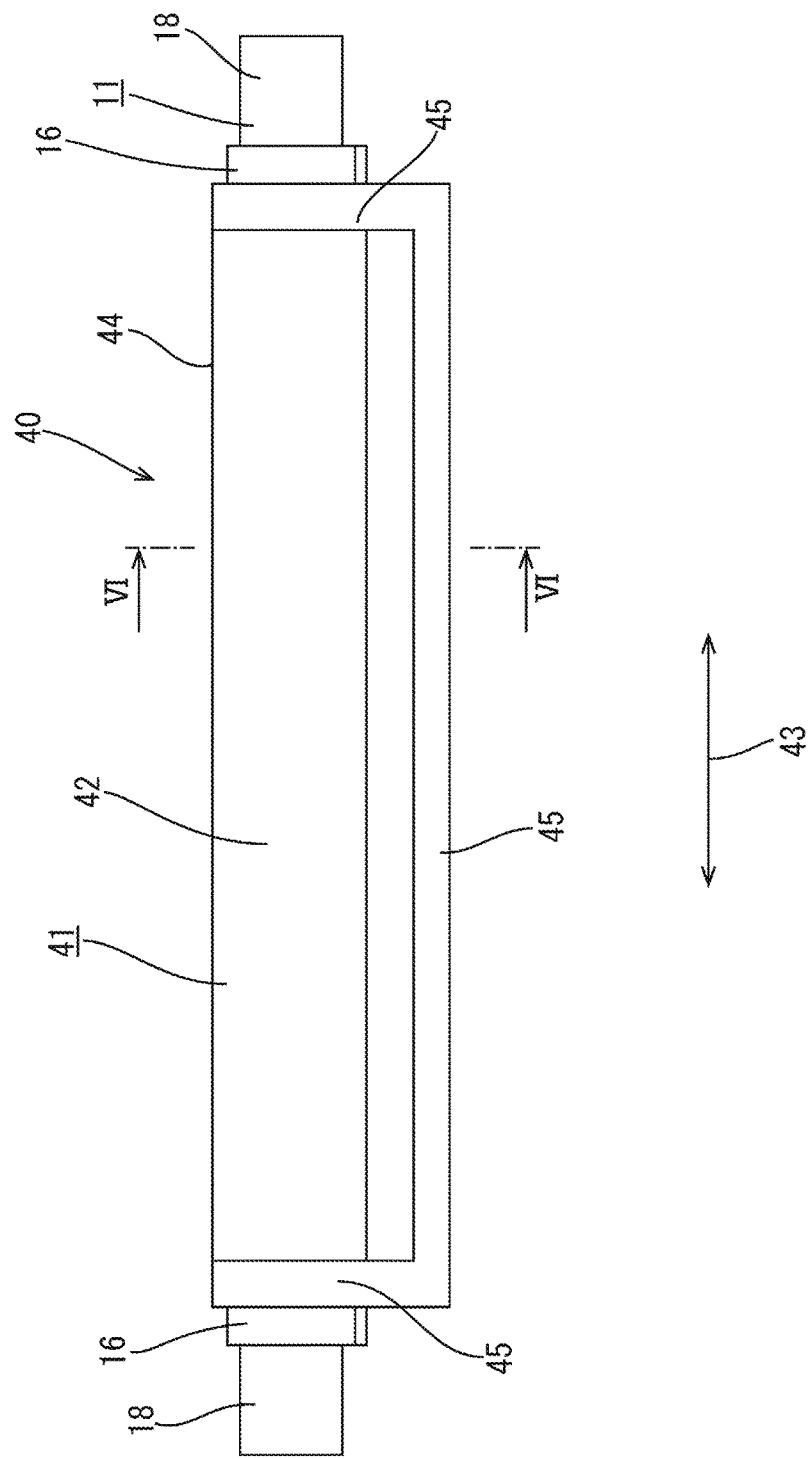
FIG. 5 is a plan view illustrating a conductive member according to a second embodiment.
Figure 6:
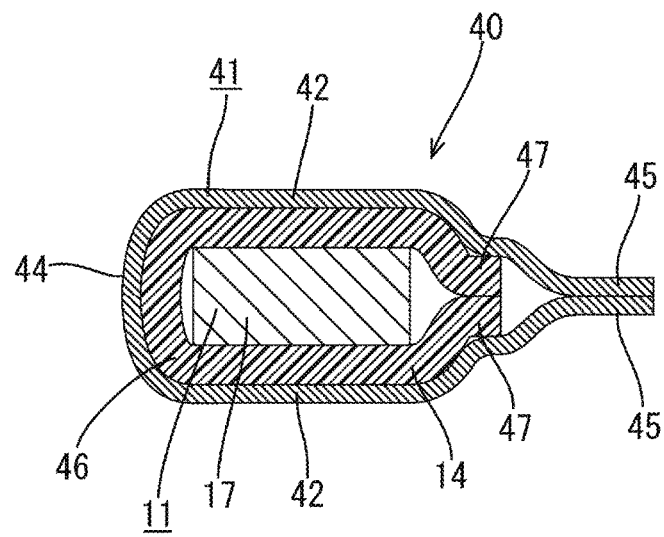
FIG. 6 is a cross-sectional view along line VI-VI in FIG. 5.

In this embodiment, the busbar 11 is formed to extend in the horizontal direction in FIG. 5. The horizontal direction in FIG. 5 corresponds with a longitudinal direction 43 of the busbar. The sheet 42 includes a folding section around which the sheet 42 is turned extends along the longitudinal direction of the busbar 11. The sheet 42 is folded such that a folding section 44 is gently curved and an internal space is formed.

The enclosure 41 includes a bonded section 45 that includes edges of the sheet 42 that is folded. The edges are located on an opposite side from the folding section 44 and placed on top of each other and liquid-tightly bonded together.

In this embodiment, an absorbent sheet 46 is wrapped around the busbar 11 and edges of the absorbent sheet 46 which are placed on top of each other are bonded together. A section of the absorbent sheet 46 including the bonded edges is referred to as an absorbent sheet bonded section 47.

Configurations other than those described above are similar to the first embodiment. The same components are indicated with the same reference signs and will not be described.

According to the configurations described above, the enclosure 41 is prepared from the single sheet 42. Therefore, the number of parts can be reduced.

Modification of the Second Embodiment

Figure 7:
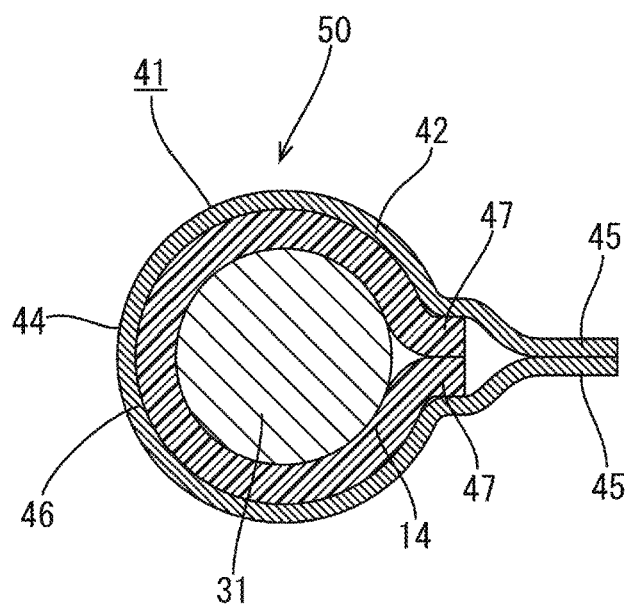
FIG. 7 is a cross-sectional view illustrating a conductive member according to a modification of the second embodiment.

In FIG. 7, a conductive member 50 according to a modification of the second embodiment is illustrated. In this modification, an electric wire 31 is used as an example of a conductor.

Other Embodiments

The technology described herein is not limited to the embodiments, which have been described using the foregoing descriptions and the drawings. For example, embodiments described below are also within the technical scope of the technology described herein.

(1) In the embodiments, the conductors have linear shapes. However, the shapes are not limited to the linear shapes. The conductors may have curved shapes.

(2) In each of the embodiments, the conductive member includes two projecting sections. However, the conductive member may include three or more projecting sections. In this case, the three or more projecting sections project from one enclosure.

(3) In each of the embodiments, one conductor is disposed in one enclosure. However, two or more conductors may be disposed in one enclosure.

LIST OF REFERENCE NUMERALS 10, 30, 30, 50: Conductive member
11: Busbar
12, 41: Enclosure
13, 42: Sheet
14: Liquid coolant
15, 46: Absorbent sheet
16: Sealant
17: Cool section
18: Projecting section
19, 45: Bonded section
31: Electric wire
43: Longitudinal direction
44: Folding section The technology described herein is a conductive member includes an enclosure, a liquid coolant, and a conductor. The enclosure includes at least one sheet and has liquid tightness. The liquid coolant is enclosed in the enclosure. The conductor includes a cool section that is disposed in the enclosure and a projecting section that projects from the enclosure. The projecting section is liquid-tightly bonded with the at least one sheet.

When the conductor is conducted, heat is generated. The heat is transmitted to the liquid coolant that is held in an absorbent sheet disposed around the conductor. As a result, the conductor is cooled. Therefore, efficiency in cooling of the conductive member can be improved.

A temperature of the liquid coolant increases due to the heat from the conductor and the liquid coolant is vaporized. The conductor of the busbar is further cooled by heat of vaporization of the liquid coolant. Therefore, the efficiency in cooling of the conductive member can be further improved.

Preferred embodiments of the technology described herein may have the following configurations.

A sealant may be disposed between the projecting section of the conductor and an inner surface of the at least one sheet. A gap between the projecting section and the sealant and a gap between the inner surface of the at least one sheet and the sealant may be liquid-tightly sealed.

According to the configuration described above, the gap between the projecting section of the conductor projecting from the enclosure and the sheet of the enclosure can be properly sealed.

An absorbent sheet may be disposed in the enclosure. The absorbent sheet may be configured to hold the liquid coolant therein.

According to the configuration described above, the liquid coolant is held in the absorbent sheet and present in an area in which the absorbent sheet is disposed. The liquid coolant is less likely to be unevenly present in the internal space of the enclosure. According to the configuration, efficiency in cooling is constant in the internal space of the enclosure.

The absorbent sheet may be disposed in an internal space of the enclosure to surround a periphery of the conductor in an internal space of the enclosure.

According to the configuration, the efficiency in cooling of the conductor is further constant.

The at least one sheet of the enclosure may include a pair of sheets disposed to overlap each other. The sheets may include edges disposed on top of each other and liquid-tightly bonded.

According to the configuration, the enclosure is prepared by a simple method, that is, by placing the sheets on top of each other and by bonding the edges that are placed on top of each other.

The at least one sheet of the enclosure may be folded. The at least one sheet may include a folding section that extends along a longitudinal direction in which the conductor extends. The at least one sheet may include edges located on an opposite side from the folding section, disposed on top of each other, and liquid-tightly bonded together.

According to the configuration, the enclosure is prepared from one sheet and thus the number of parts can be reduced.

According to the technology described herein, the efficiency in cooling of the conductive member can be improved.

The invention claimed is:

1. A conductive member comprising:
    an enclosure including at least one sheet and having liquid tightness;
    a liquid coolant enclosed in the enclosure; and
    a conductor including a cool section disposed in the enclosure and a projecting section projecting from the enclosure and being liquid-tightly bonded with the at least one sheet.

2. The conductive member according to claim 1, further comprising a sealant disposed between the projecting section of the conductor and an inner surface of the at least one sheet, wherein a gap between the projecting section and the sealant and a gap between the inner surface of the at least one sheet and the sealant are liquid-tightly sealed.

3. The conductive member according to claim 1, further comprising an absorbent sheet disposed in the enclosure, wherein the absorbent sheet is configured to hold the liquid coolant therein.

4. The conductive member according to claim 3, wherein the absorbent sheet is disposed in an internal space of the enclosure to surround a periphery of the conductor in an internal space of the enclosure.

5. The conductive member according to claim 1, wherein
    the at least one sheet of the enclosure includes a pair of sheets disposed to overlap each other, and
    the sheets include edges disposed on top of each other and liquid-tightly bonded.

6. The conductive member according to claim 1, wherein
    the at least one sheet of the enclosure is folded and includes a folding section extending along a longitudinal direction in which the conductor extends, and
    the at least one sheet includes edges located on an opposite side from the folding section, disposed on top of each other, and liquid-tightly bonded together.

* * * * *